United States Patent

Okamoto et al.

[11] Patent Number: 5,876,483
[45] Date of Patent: Mar. 2, 1999

[54] METHOD AND FURNACE FOR DISPOSAL OF STEEL-MAKING WASTE, AND OPERATING METHOD OF THE FURNACE

[75] Inventors: Tetsuo Okamoto, Chita; Motoshi Shinkai, Chita-gun, both of Japan

[73] Assignee: Daido Tokushuko Kabushiki Kaisha, Nagoya, Japan

[21] Appl. No.: 568,120

[22] Filed: Dec. 6, 1995

[30] Foreign Application Priority Data

Dec. 8, 1994 [JP] Japan ..................... 6-331563
Dec. 8, 1994 [JP] Japan ..................... 6-331564

[51] Int. Cl.[6] ............................ C22B 19/00
[52] U.S. Cl. ............... 75/582; 75/10.41; 75/10.66; 75/414; 75/581
[58] Field of Search ................ 75/10.41, 10.66, 75/414, 581; 110/342; 373/8

[56] References Cited

U.S. PATENT DOCUMENTS

| | | | |
|---|---|---|---|
| 4,831,943 | 5/1989 | Aune | 110/346 |
| 5,065,680 | 11/1991 | Cheetham | 110/342 |
| 5,180,421 | 1/1993 | Rostoker et al. | 75/414 |
| 5,259,868 | 11/1993 | Schneider et al. | 75/414 |
| 5,358,549 | 10/1994 | Nagel et al. | 75/414 |
| 5,402,439 | 3/1995 | Bullman et al. | 373/9 |
| 5,493,578 | 2/1996 | Fukasaki et al. | 373/8 |
| 5,493,580 | 2/1996 | Fudala | 75/10.64 |

FOREIGN PATENT DOCUMENTS

| | | | |
|---|---|---|---|
| 61132549 A | 6/1986 | Japan | 110/342 |
| 06183794 A | 7/1994 | Japan | C04B 5/06 |
| 7215741 | of 1995 | Japan . | |

*Primary Examiner*—Patrick Ryan
*Assistant Examiner*—M. Alexandra Elve
*Attorney, Agent, or Firm*—Sughrue, Mion, Zinn, Macpeak & Seas, PLLC

[57] ABSTRACT

A melting furnace for reforming steel-making slag so as to be available, for example, to roadbed ballast by mixing steel-making dust with the slag in molten states, which is provided with a fuel oxygen burner for melting the slag and the dust, a slag charging port for charging the slag in molten state into the furnace, a dust feeder for supplying the dust into the furnace, a slag feeder for supplying the slag in powdered state into the furnace, a storage portion for storing a molten mixture of the slag and the dust in a quantity corresponding to a tilting angle of the furnace body and an outlet port for discharging the molten mixture, and is possible to dispose the slag efficiently whether the slag is in the powdered or molten state.

12 Claims, 7 Drawing Sheets

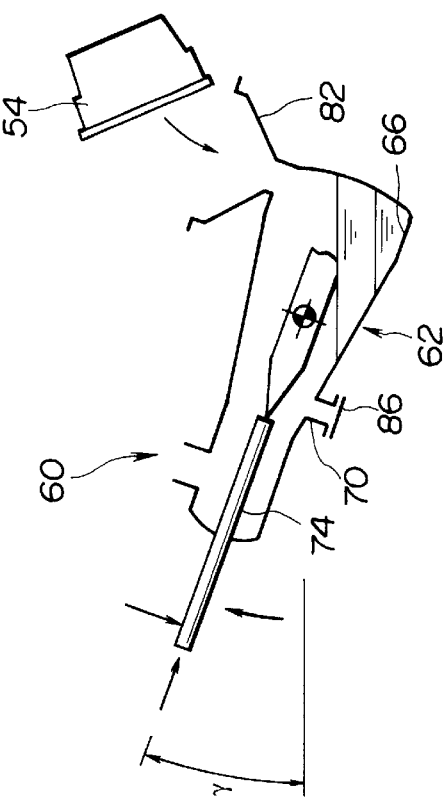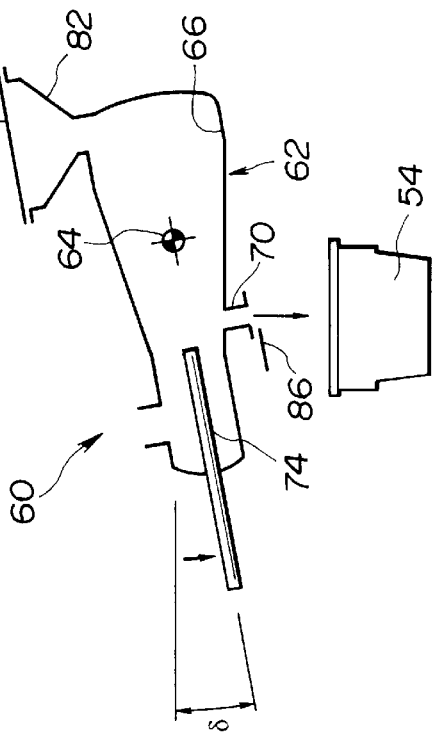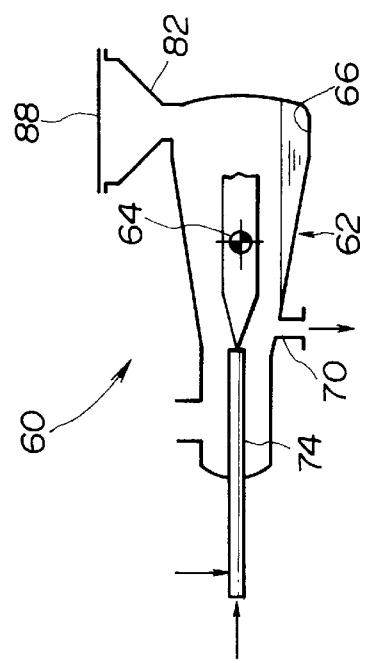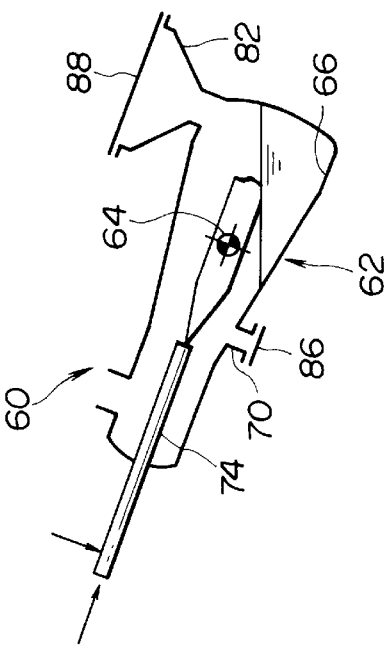

METHOD AND FURNACE FOR DISPOSAL OF STEEL-MAKING WASTE, AND OPERATING METHOD OF THE FURNACE

BACKGROUND OF THE INVENTION

1. Field of the Invention

This invention relates to a method and a furnace for disposal of steel-making waste such as dust caught by dust collecting equipment and slag (especially, slag containing CaO in a large quantity such as reducing slag, which will be described later), and an operating method for running the furnace very efficiently.

2. Description of the Prior Art

In the steel making by using an electric furnace or the like, dust generated from the furnace has been collected by equipping the dust collecting equipment in order to prevent air pollution.

The dust, that is steel-making waste is fine (1–5 μm, for example) powder and contains FeO, $Fe_2O_3$ (approximately 60%) and ZnO (approximately 15%), nevertheless it is difficult to be recycled, therefore it is the fact that the dust has been discarded without any treatment up to now.

In the steel making through the electric furnace, for example, oxidizing slag and reducing slag are exhausted as steel-making waste according to progression of steel refining.

Among them, the oxidizing slag, which is produced in an oxidizing period of steel making and exhausted after the oxidizing period, has been utilized as materials for road construction such as roadbed ballast of asphalt-surfaced roads and the like, however the reducing slag, which is produced in a reducing period and exhausted after the reducing period in the steel making, has no use in particular and has been discarded as it is.

Namely, the reducing slag contains free CaO in a large quantity as a chemical component, the free CaO changes into $Ca(OH)_2$ and expands cubically by absorbing water. Therefore, the reducing slag is not possible to be applied for the roadbed materials or so as it is, and has been discarded without being recycled.

In discarding the dust and the reducing slag, it is required to go to the expense of abandonment. Therefore, there is a problem since the abandonment of the steel-making waste of this kind causes an increase in the cost of steel making.

SUMMARY OF THE INVENTION

This invention is made in view of the aforementioned problem of the prior art, and it is an object to provide a disposal method possible to recycle the steel-making waste such as dust and slag, a furnace suitable for carrying out the disposal method, and an operating method possible to run the furnace very efficiently.

The method for disposal of steel-making waste according to one aspect of this invention is characterized in that CaO content in steel-making slag is reduced by mixing dust caught by dust collecting equipment with the steel-making slag in molten states, respectively.

In the method for disposal of steel-making waste according to embodiments of this invention, one or both of steel-making dust and waste incineration dust may be used as the dust.

The furnace for melting and mixing together steel-making slag and dust according to another aspect of this invention is characterized by comprising (a) a furnace body installed tiltably, (b) a fuel oxygen burner disposed in an upper part of the furnace body so as to be directed toward the inner part of the furnace body, (c) a slag charging port formed in a side wall of the furnace body at a position in one of tiltable directions for charging the slag into the inner part of the furnace body in a molten state, (d) a dust feeding means for continuously supplying the dust into the inner part of the furnace body, (e) a slag feeding means for continuously supplying the slag into the inner part of the furnace body in a powdered state, (f) a storage portion formed in a lower part of the furnace body for storing a molten mixture of the slag and the dust in a quantity corresponding to a tilting angle of the furnace body, and (g) an outlet port formed in the side wall of the furnace body at a position on the opposite side of the slag charging port for discharging the molten mixture stored in the storage portion of the furnace body.

The other furnace for melting and mixing together steel-making slag and dust according to this invention is characterized by comprising (a) a horizontally elongated furnace body installed tiltably in a longitudinal direction of the furnace body, (b) a fuel oxygen burner disposed to one of side walls of the furnace body opposed with each other in the longitudinal direction so as to be directed toward the other one of side walls of the furnace body, (c) a slag charging port formed in the furnace body at a position on the opposite side of the fuel oxygen burner for charging the slag into the inner part of the furnace body in a molten state, (d) a dust feeding means for continuously supplying the dust into the inner part of the furnace body, (e) a slag feeding means for continuously supplying the slag into the inner part of the furnace body in a powdered state, (f) an outlet port formed in a bottom wall of the furnace body for discharging a molten mixture of the slag and the dust, and (g) a storage portion formed in a lower part of the furnace body between the outlet port and the other one of side walls of the furnace body for storing the molten mixture in a quantity corresponding to a tilting angle of the furnace body.

The first embodiment of the furnace according to this invention is characterized in that the fuel oxygen burner is provided with a dust nozzle at a tip end thereof for blowing out the dust into a flame of the burner and serves also for the dust feeding means.

The second embodiment of the furnace according to this invention is characterized in that the fuel oxygen burner is provided with a slag nozzle at a tip end thereof for blowing out the powdered slag into a flame of the burner and serves also for the slag feeding means.

The third embodiment of the furnace according to this invention is characterized in that the fuel oxygen burner is provided with a powder nozzle at a tip end thereof for blowing out the dust and the powdered slag into a flame of the burner and serves also for the dust feeding means and the slag feeding means.

The fourth embodiment of the furnace according to this invention is characterized in that the fuel oxygen burner is further provided with a slag nozzle at the tip end thereof for blowing out the powdered slag into the flame and further serves for the slag feeding means at the same time.

The operation method according to the other aspect of this invention is suitable for running the furnace according to this invention using the slag in a powdered state and characterized by comprising the step of putting the furnace body in a first inclined position where the outlet port of the furnace body becomes lower, supplying the powdered slag and the dust into the inner part of the furnace body continuously through the slag feeding means and the dust feeding means, melting the powdered slag and the dust continuously by the fuel oxygen burner, storing the molten mixture of the slag and the dust in the storage portion of the furnace body, and continuously discharging the molten mixture stored in the storage portion by making the molten mixture to overflow through the outlet port.

The other operation method according to this invention is suitable for running the furnace according to this invention using the slag in a molten state and characterized by comprising the step of putting the furnace body in a second inclined position where the outlet port of the furnace body becomes higher, charging the molten slag into the inner part of the furnace body through the slag charging port of the furnace body, melting the dust supplied through the dust feeding means continuously by the fuel oxygen burner, storing the molten mixture of the slag and the dust in the storage portion of the furnace body, and discharging the molten mixture stored in the storage portion through the outlet port by tilting the furnace body so as to lower the outlet.

BRIEF DESCRIPTION OF THE DRAWINGS

FIGS. 7A to 7D are vertical sectional views illustrating successively an operation method for the furnace shown in FIG. 4.

DETAILED DESCRIPTION OF THE INVENTION

Figure 1:
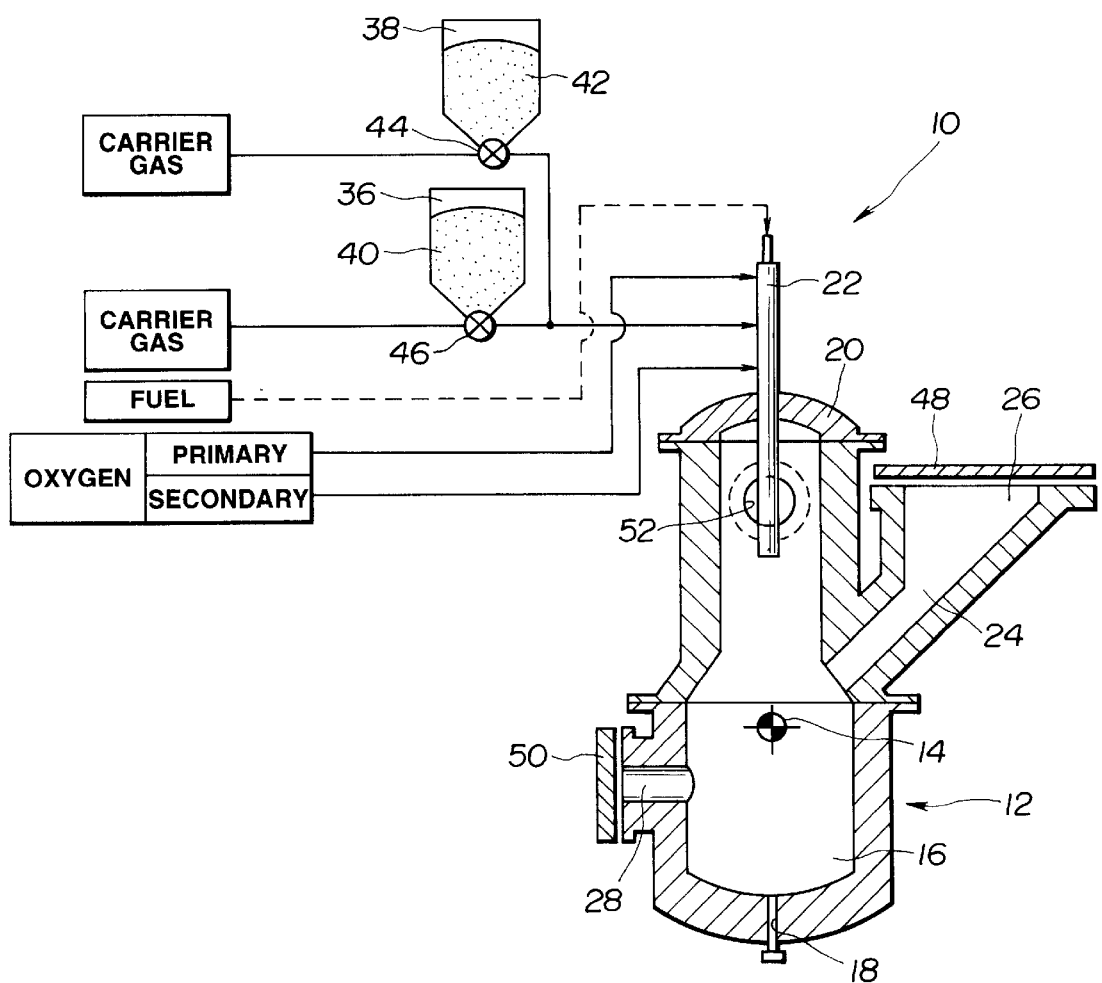
FIG. 1 is a vertical sectional view illustrating an embodiment of a furnace according to this invention.

In the method for disposal of steel-making waste according to this invention, dust such as steel-making dust and waste incineration dust caught by dust collecting equipment is mixed with steel-making slag in molten states so as to decrease the CaO content in the steel-making slag. Therefore, even the steel-making slag containing a large quantity of CaO such as the reducing slag which is exhausted after the reducing period in steel-making changes into slag having a component similar to that of the oxidizing slag which is exhausted after the oxidizing period in steel-making, and becomes available for the road construction materials such as roadbed ballast and so on.

The waste incinaration dust to be used in the method for disposal of steel-making waste according to this invention is dust caught by dust collecting equipment installed to an arc or plasma incinerator at the time of disposing waste including municipal refuse, and generally consists of 40–50% of CaO, 8–15% of $SiO_2$, 4–7% of $Al_2O_3$, 3–4% of $Na_2O_3$, 2–4% of MgO and 1–2% of $Fe_2O_3$.

In the disposal method according to this invention, the dust collected by the dust collecting equipment and the steel-making slag may be molten and mixed with each other by being heated in an adequate furnace. However, in a case where expensive equipment is required for the disposal or cost of the disposal becomes higher as compared with that of the discarding or abandonment, practical value of the method according to this invention is lowered.

Additionally, although the dust is obtained in the powdered state as its original shape and managed in the powdered state, the steel-making slag is obtained in the molten state at the time of being discharged from the steel-making furnace and congeals to the solid state when cooled. Accordingly, it is desirable that the steel- making slag can be managed whether in the powdered state or in the molten state.

Furthermore, it is desirable that the steel-making slag can be managed whether in the powdered state or in the molten state.

Namely, in a case of managing the steel-making slag in the molten state, it is desirable to be possible to manage the slag in a large quantity at a time because a large bulk of slag is exhausted from the steel-making furnace at one time. It is further desirable to be possible to manage the steel-making slag no matter whether in the powdered state or in the molten state through the same equipment and facilities by changing over the slag between powdered and molten states according to the situation.

The furnace according to this invention is provided with a tiltable furnace body, a fuel oxygen burner directed to the inner part of the furnace body, a slag charging port formed in the furnace body at a position in one of tiltable directions for charging the slag into the furnace body in the molten state, a dust feeding means for continuously supplying the dust into the furnace body, a slag feeding means for continuously supplying the dust into the furnace body in the powdered state, a storage portion formed in a lower part of the furnace body for storing a molten mixture of the slag and the dust in a quantity corresponding to a tilting angle of the furnace body, and an outlet port formed in the furnace body at a position in the other one of tiltable directions for discharging the molten mixture of the slag and the dust. Therefore, the dust and the steel-making slag are disposed by changing over the working position of the furnace body between first and second inclined positions according to the form of the steel-making slag to be managed.

Namely, in the operation method according to this invention, the furnace body is put in the first inclined position where the outlet port of the furnace body becomes lower when the steel-making slag is in the powdered state. The powdered slag and the dust are supplied continuously into the furnace body in the first inclined position through the slag feeding means and the dust feeding means, and molten by heat of a flame generated from the fuel oxygen burner. The molten dust and the molten slag are mixed sufficiently and interact in the storage portion at the lower part of the furnace body, and then the molten mixture of the slag and the dust is discharged continuously by overflowing though the outlet port of the furnace body remaining in the first inclined position. In the case of continuously melting and mixing the slag and the dust by supplying them into the furnace body in the powdered states, it is not necessary to increase capacity of the storage portion in the furnace body so much since the slag and the dust are speedily molten and mixed with each other sufficiently, and it is rather unfavorable to increase the capacity of the storage portion in view of the operating cost because thermal radiation becomes larger from the molten mixture stored in a large quantity and thermal energy loss becomes larger.

In the operation method of this invention, the furnace body is set in the first inclined position so as to lower the position of the outlet port in the case of managing the powdered steel-making slag. Therefore, the capacity of the storage portion in the the lower part of the furnace body becomes smaller relatively and it is possible to minimize the amount of the thermal radiation from the molten mixture stored in the storage portion in the furnace body.

On the other side, the furnace body is set in the second inclined position in a case of managing the steel-making slag in the molten state as it is without solidifying. In this time, the outlet port of the furnace body becomes higher relatively, whereby the capacity of the storage portion in the furnace body becomes larger.

Accordingly, it becomes possible to charge the large quantity of the molten slag into the furnace body through the slag charging port at one time, and it is possible to discharge the molten mixture through the outlet port disposed in the opposed side of the slag charging port by tilting the furnace body in the direction of the outlet port after sufficiently mixing the dust and the slag in the molten states in the storage portion in the furnace body.

In this manner, according to the operation method of this invention, the dust and the steel-making slag are disposed by changing over the working position of the furnace body suitably between the first and the second inclined positions according to the form of the steel-making slag. It is possible to decreasingly or increasingly change the capacity of the storage portion of the same furnace body and possible to control always the capacity of the storage portion in a proper quantity.

Therefore, according to this invention, it is possible not only to compactly construct the furnace body, but also to minimize the thermal energy loss and possible to reduce the equipment cost and the operating cost. In addition to the above, it is possible to suitably manage the steel-making slag whether the slag is in the powdered state or in the molten state. Especially in a case of managing the slag in the molten state, it is possible to mix the slag and the dust with each other in the molten states without consuming the thermal energy so much.

In this invention, the furnace body can be structured in compact, accordingly it is possible to reduce expenses for refractory material and maintenance, and possible to decrease the thermal radiation from the furnace body and to apply heat of flame of the fuel oxygen burner on the dust and the steel-making slag very efficiently.

According to demand in this invention, the powdered dust may be blown into the flame from the fuel oxygen burner though a dust nozzle provided in the top end of the burner. In such the case, it is possible to immediately heat and melt the dust supplied into the furnace body, and an advantage is obtained that the dust becomes very reactive with the steel-making slag.

Of course, such the powdered dust may be supplied into the furnace body through a lance nozzle disposed separately from the burner.

Further in this invention, in the case of supplying the steel-making slag into the inner part of the furnace body in the powdered state, the powdered slag may be blown into the flame through a slag nozzle provided in the top end of the fuel oxygen burner. In this case, it is possible to immediately heat and melt the powdered slag supplied into the furnace body, and possible to make the slag very reactive with the dust in the furnace body.

DESCRIPTION OF THE PREFERRED EMBODIMENTS

The first embodiment of the furnace according to this invention and the method for operating the furnace will be described below on basis of FIGS. 1 to 3.

In FIG. 1, the numeral 10 shows a furnace for disposing dust caught by dust collecting equipment and steel-making slag, and the furnace 10 is provided with a furnace body 12 of vertical type. The furnace body 12 is so installed as to be tiltable about a horizontal axis 14 passing the central part thereof.

The furnace body 12 is provided with a storage portion 16 for storing molten dust, molten slag and the mixture of them in the lower part thereof, and formed with a gas port 18 in a bottom wall of the furnace body 12 for blowing out bubbling gas in order to mix the molten dust and slag by stirring.

An upper opening of the furnace body 12 is so structured as to be closed with a cap 20, and an upper part of furnace body 12 is structured by the cap 20. Furthermore, a fuel oxygen burner 22 is provided to the upper part of the furnace body 12 so as to pierce though the cap 20 and to be directed toward the bottom section of the furnace body 12.

In this time, the position of the fuel oxygen burner 22 is adjusted so that the flame end of the burner 22 may nearly reach a surface of the molten mixture stored in the storage portion in the bottom section of the furnace body 12 after considering the size of the furnace body 12.

The furnace body 12 is provided with a slag charging port 24 in a side wall on the right side in FIG. 1 (in one of tiltable directions of the furnace body 12) for charging the molten steel-making slag in a large quantity at one time, and provided with an outlet port 28 in the side wall of the furnace body 12 on the left side in FIG. 1 (at the opposite position of the slag charging port 24) for discharging the molten mixture.

The slag charging port 24 is formed so as to extend in the upper right direction from the middle section of the furnace body 12 and formed so that an opening face 26 at the upper end of the slag charging port 24 may be horizontal at the time of holding the furnace body 12 in the vertical position.

The other side, the outlet port 28 is formed at a position relatively near to the bottom wall of the furnace body 12 so that an axis of the outlet port 28 may be horizontal when the furnace body 12 is held nearly in the vertical position.

Figure 2:
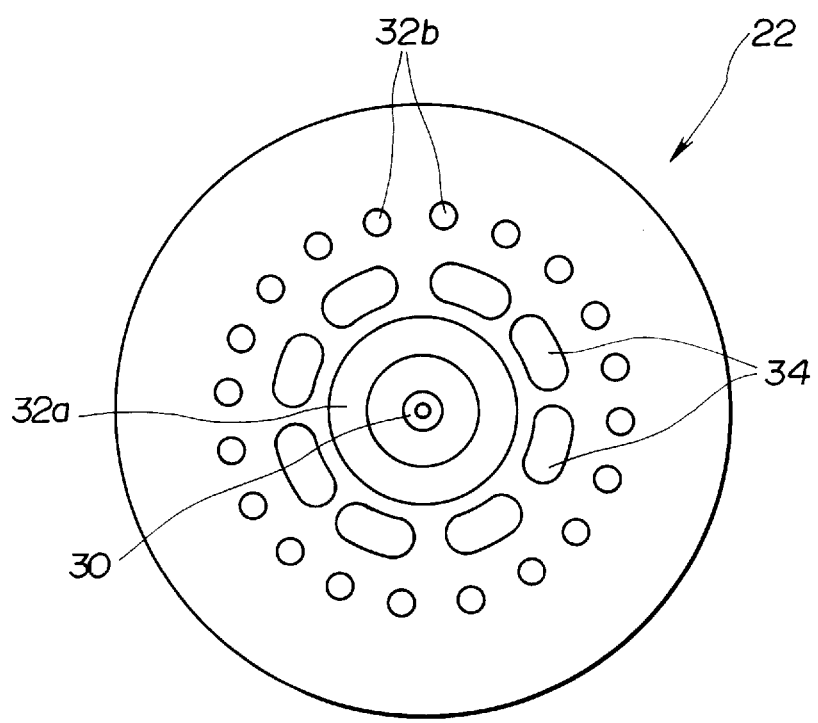
FIG. 2 is an end view illustrating a tip end of a fuel oxygen burner of the furnace shown in FIG. 1.

FIG. 2 illustrates a nozzle face at the end of the fuel oxygen burner 22, the burner 22 is provided with a fuel nozzle 30 at the central part of the nozzle face for blowing out fuel (which is kerosene in this embodiment), and so designed as to spray the fuel through the fuel nozzle 30.

The fuel oxygen burner 22 is further formed with an annular shaped oxygen nozzle 32a surrounding the fuel nozzle 30 for blowing out primary oxygen.

In the most outer peripheral part on the nozzle face of the burner 22, a plurality of oxygen nozzles 32b are formed at predetermined equal spaces around the circumference for blowing. Out secondary oxygen, so that the burner 22 is so designed as to blow out the primary and secondary oxygen through the oxygen nozzles 32a and 32b, respectively.

Furthermore, a plurality of arcuate-oval shaped powder nozzles 34 are formed so as to surround the fuel nozzle 30 between the oxygen nozzles 32a and 32b.

The burner 22 is so structured as to be supplied with steel-making dust 40 caught by dust collecting equipment equipped to the electric furnace and powdered reducing slag 42 exhausted from the electric furnace after the reducing period as steel-making slag, which are contained in a dust hopper 36 and a slag hopper 38, respectively as shown in FIG. 1. The dust 40 and the powdered slag 42 are blown into a flame of the burner 22 through the powder nozzles 34.

The dust and slag supply are controlled by valves or feeders 44 and 46 disposed to supply ports of the hoppers 36 and 38, and the dust 40 and the slag 42 are carried by carrier gas (air in this embodiment).

Chemical compositions of the dust 40 and the slag 42 are exemplified in Table 1.

TABLE 1

|  | Chemical Composition (wt %) | | | | | |
| --- | --- | --- | --- | --- | --- | --- |
|  | $SiO_2$ | CaO | FeO | $Al_2O_3$ | C | ZnO |
| Dust | 5 | 5 | 55 | 3 | 1~3 | 20 |
| Slag | 25 | 50 | 1 | 11 | <1 | <1 |

In FIG. 1, the numerals 48 and 50 are covers for closing the slag charging port 24 and the outlet port 28 respectively, and the numeral 52 shows a dust collection port for collecting secondary dust in the furnace body 12. The dust collection port 52 is formed in the side wall of the furnace body 12 on the rear side of FIG. 1.

Next, an explanation will be given about the operation method for disposing the slag in the powdered or molten state together with the dust by using the above-mentioned furnace 10 on basis of FIG. 3A to FIG. 3E.

Figure 3A:
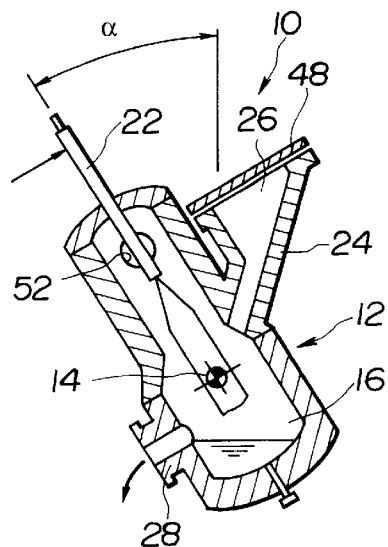
FIGS. 3A to 3E are vertical sectional views illustrating successively an operation method for the furnace shown in FIG. 1.

FIG. 3A shows an operating state of the furnace 10 in a case of managing the slag in the powdered state.

Namely, the furnace body 12 is inclined in the anticlockwise direction at a predetermined angle ($\alpha=30$ deg., for example) so as to lower the outlet port 28 (first inclined position) as shown in FIG. 3A. Subsequently, the fuel is blown out from the fuel oxygen burner 22 together with oxygen and bursts into flame by ignition in this state.

Simultaneously, the dust 40 and the powdered slag 42 are blown into the flame through the powder nozzles 34 of the burner 22, thereby melting the dust 40 and the slag 42 in the flame successively.

The molten dust and the molten slag are stored in the storage portion 16 at the bottom section of the furnace body 12, and react with each other by being mixed sufficiently in the storage portion 16.

In this manner, the dust 40 and the powdered slag 42 are melted successively by being fed into the flame in the furnace body 12 from the burner 22, whereby the surface level of the molten mixture in the storage portion 16 rises according as the molten dust and slag increase in quantity. Therefore, the molten mixture of dust and slag is discharged continuously according to the increase of the molten mixture by overflowing through the outlet port 28 which has shifted to the lower side by the inclination of the furnace body 12.

In this case, because the level of the outlet port 28 is lowered by holding the furnace body 12 at the inclined position as shown in FIG. 3A, the capacity of the storage portion 16 becomes smaller and the molten mixture stored in the storage portion 16 decreases in the quantity. Consequently, thermal radiation from the molten mixture and thermal energy loss are controlled to minimum.

Furthermore, in the case of continuously feeding the dust 40 and the powdered slag 42 into the furnace body 12 and melting them successively by the fuel oxygen burner 22, the molten dust and the molten slag are mixed quickly and react sufficiently with each other. Therefore, it is possible to operate the furnace 10 without hindrance even when the capacity of the storage portion 16 of the furnace body 12 is not so large, and the molten mixture is discharged through the outlet port 28 in the state where chemical compositions of the dust and the slag are uniformized sufficiently.

FIGS. 3B to 3E show operating procedure for the furnace 10 successively in a case of managing the slag in the molten state through batch wise processing.

Figure 3B:
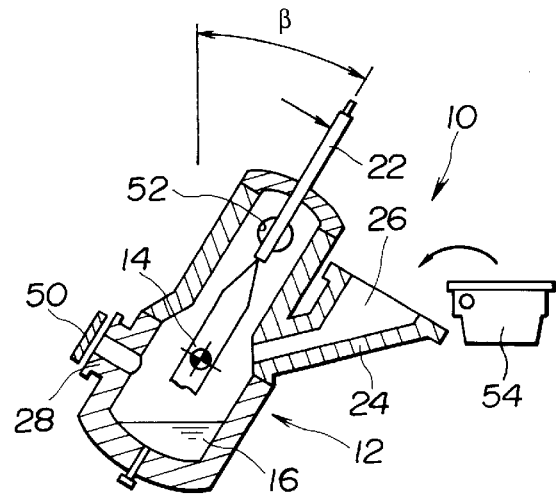

FIG. 3B shows a state of the furnace body 12 before charging the molten reducing slag. In the case of managing the slag just exhausted from the electric furnace in the molten state, the furnace body 12 is inclined in the clockwise direction at a predetermined angle ($\beta=30$ deg., for example) contrary to the case shown in FIG. 3A, whereby the outlet port 28 is located on the upper side (second inclined position) as compared with the position at the time when the furnace body 12 has been in the vertical position, as shown in FIG. 3B.

Additionally, FIG. 3B shows the situation of the furnace body 12 at the time of being changed over to the second inclined position from the position shown in FIG. 3A in order to manage the molten slag, accordingly a certain amount of molten mixture is stored in the storage portion 16 at the bottom section of the furnace body 12.

As it is clear from comparison between FIG. 3A and FIG. 3B, the outlet port 28, which was located at the level nearly equal to the surface level of the molten mixture when the furnace body 12 was in the first inclined position, is located at a position higher than the surface of the molten mixture by setting the furnace body 12 in the second inclined position shown in FIG. 3B. Namely, the capacity of the storage portion 16 at the bottom section becomes larger by changing over the furnace body 12 into the second inclined position.

In this state, the hot slag is charged into the inner part of the furnace body 12 through the slag charging port 24, which has been just exhausted from the steel-making furnace in a large quantity at one time in the molten state.

Figure 3C:
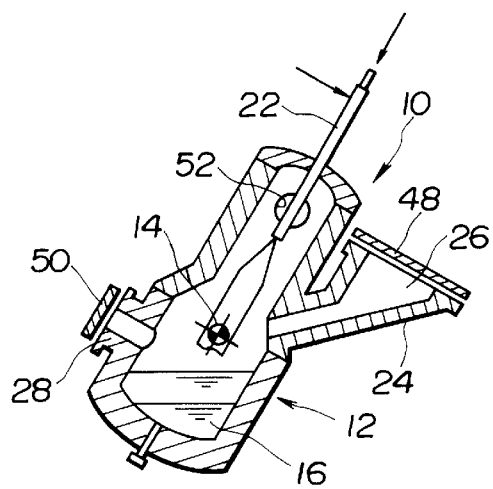
Figure 3D:
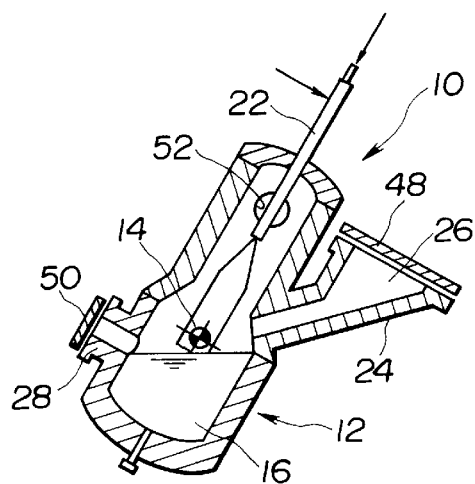

FIG. 3C shows circumstances in the furnace body 12 in this time. As shown in FIG. 3C, the molten mixture in the storage portion 16 is not still mixed uniformly with the charged molten slag when the molten slag is charged into the furnace body 12. Therefore, the dust 40 is blown continuously into the furnace body 12 through the powder nozzles 34 of the fuel oxygen burner 22 and molten in the flame of the burner 22, thereby mixing the molten dust with the molten slag. The furnace body 12 is maintained in this second inclined position, and the molten dust and the molten slag are mixed sufficiently and react with each other in the storage portion 16 having the increased capacity during this process as shown in FIG. 3D.

Figure 3E:
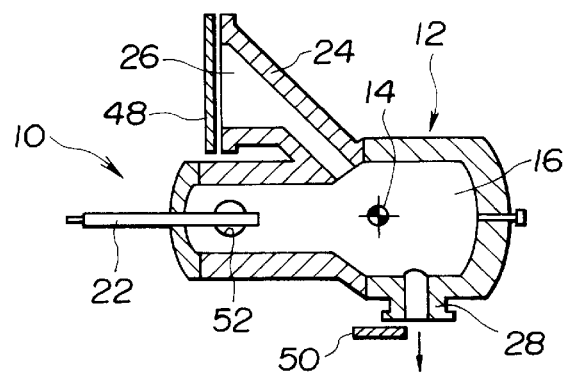

When the molten slag is mixed and reacts sufficiently with the molten dust in the predetermined quantity, the molten mixture stored in the storage portion 16 at the bottom section of the furnace body 12 is discharged through the outlet port 28 by tilting the furnace body 12 in the anticlockwise direction as shown in FIG. 3E.

The chemical composition of the mixture obtained through this process are shown in Table 2, for example. Table 2 shows the chemical compositions of the mixture of dust and slag in cases of changing the ratio of the dust to the slag in three degrees, together with ZnO content in secondary dust collected through the dust collecting port 52 of the furnace body 12 in the respective cases, for reference.

TABLE 2

| Mixing Ratio | Dust | 1 | 1 | 1 |
|---|---|---|---|---|
| | Slag | 0 | 1 | 3 |
| Main Chemical Composition of obtained Mixture(wt %) | $SiO_2$ | 5~10 | 12~17 | 16~22 |
| | CaO | 5~7 | 26~32 | 34~42 |
| | FeO | 48~55 | 24~30 | 12~17 |
| | $Al_2O_3$ | 3~7 | 6~10 | 8~12 |
| | ZnO | 7~12 | 4~7 | 1~4 |
| ZnO in Secondary Dust | | 50~65 | 35~50 | 20~35 |

It is seen from Table 2 that CaO content in the obtained mixture of dust and slag is reduced as compared with that of the original slag (see Table 1) owing to the mixing of the dust, therefore it is possible to apply the obtained mixture for the roadbed materials without aging or after aging in a short period. Furthermore, ZnO content in the secondary dust is concentrated as compared with that of the dust (steel-making primary dust), accordingly there is the possibility that the secondary dust obtained in the disposal of the steel-making waste may be recycled as a material for zinc.

The second embodiment of the furnace according to this invention and the method for operating the furnace will be described below on basis of FIGS. 4 to 8.

Figure 4:
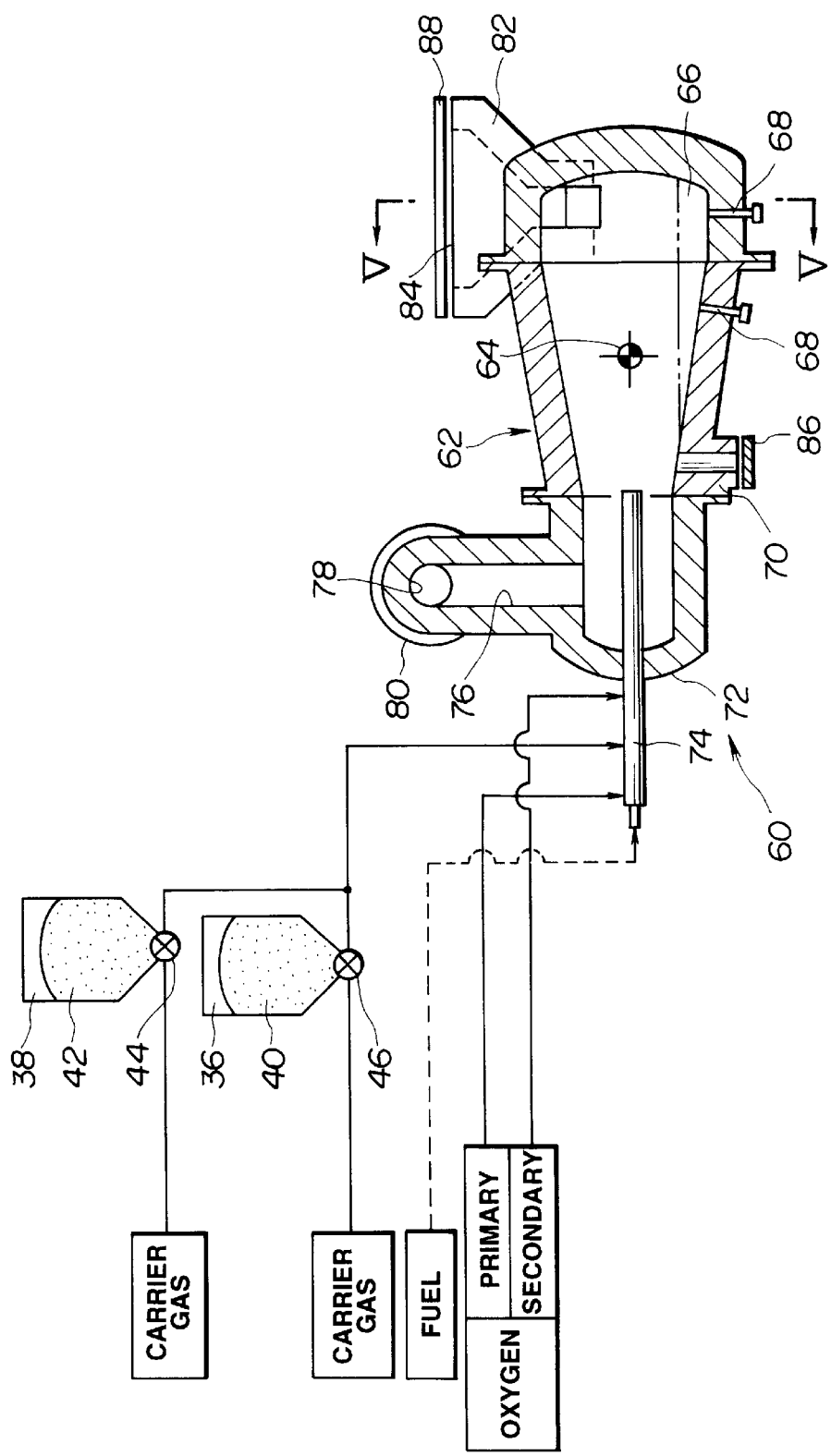
FIG. 4 is a vertical sectional view illustrating another embodiment of a furnace according to this invention.
Figure 5:
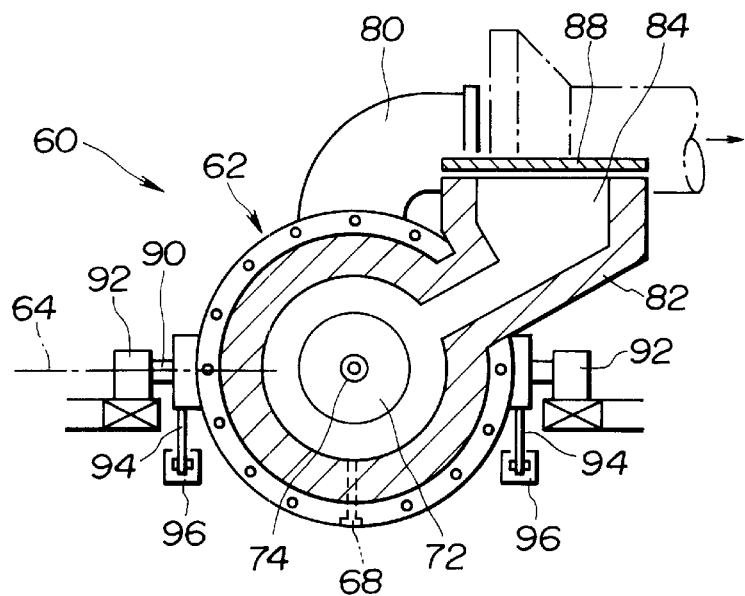
FIG. 5 is a transverse sectional view along section lines V—V of FIG. 4.

In FIGS. 4 and 5, the numeral 60 is a furnace for disposing the dust and the slag similarly to the furnace 10 explained in the first embodiment of this invention. The furnace 60 is provided with a furnace body 62. The furnace body 62 is of horizontal type having a horizontally elongated shape, and so installed as to be tiltable about a horizontal axis 64 passing through the inner part of the furnace body 62 at a position shifted slightly to the right from the center in the longitudinal direction as shown in FIG. 4.

The furnace body 62 is so designed that the inner diameter may be increased gradually in the rightward direction in FIG. 4 at the middle part thereof. Namely, the bottom wall of the furnace body 62 is designed in a concaved form, where a storage portion 66 is formed for storing molten dust, molten slag and the mixture of them, and made with gas ports 68 for blowing bubbling gas into the storage portion 66 in order to mix the molten dust and slag by stirring.

The bottom wall of the furnace body 62 is provided with an outlet port 70 at the adjacent to the storage portion 66 for exhausting the molten mixture of dust and slag. The outlet port 70 is formed so that its axis may be vertical at the time of holding the furnace body 62 in the horizontal position.

On the left side of the furnace body 62 in FIG. 4, a fuel oxygen burner 74 is provided horizontally to a side wall 72 of the furnace body 62 so as to pierce through the side wall 72 and be directed to a side wall in the right side of the furnace body 62.

Furthermore, on the left side of an upper wall, the furnace body 62 is formed with a passage 76 upwardly for exhausting secondary dust in the inner part of the furnace body 62 and a dust collecting duct 80 is connected to a dust collecting port 88 formed at the end of the passage 76.

The other side, on the right side of the upper wall, the furnace body 62 is provided with a slag charging port 82 for charging the molten slag exhausted from the steel-making furnace in a large quantity at one time. The slag charging port 82 extends in the upper right direction in FIG. 5 and is formed so that an opening face 84 at the upper end of the slag charging port 82 may be horizontal at the time when the furnace body 62 is put in the horizontal position.

In FIGS. 4 and 5, the numerals 86 and 88 are covers for closing the outlet port 70 and the slag charging port 82, respectively.

In FIG. 5, the numeral 90 is shaft for supporting the furnace body 62 swingingly, which is rotatably supported through the bearings 92 at the both ends thereof. The furnace body 62 is provided with a pair of arms 94 protruding downwardly therefrom, and the respective ends of the arms 94 are connected to a pair of hydraulic cylinders 96. Therefore, the furnace body 62 is so structured as to be inclined according to working of the hydraulic cylinders 96 through the arms 94 in this embodiment.

Figure 6:
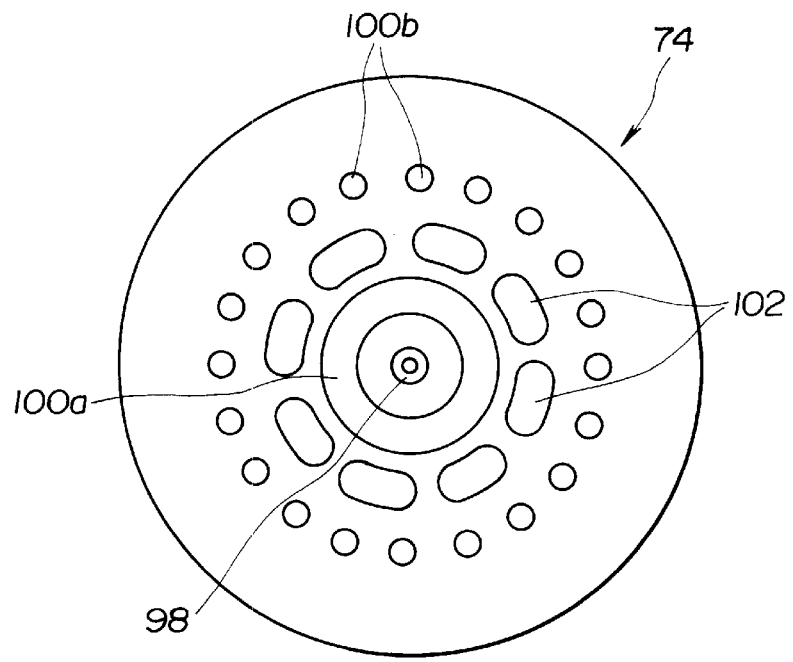
FIG. 6 is an end view illustrating a tip end of a fuel oxygen burner of the furnace shown in FIG. 4.

FIG. 6 shows a nozzle face at the end of the fuel oxygen burner 74, the burner 74 is provided with a fuel nozzle 98 at the center of the nozzle face for blowing out fuel (kerosene), and so designed as to spray the fuel through the fuel nozzle 98 similarly to the case of aforementioned first embodiment.

The fuel oxygen burner 22 is further provided with an annular shaped oxygen nozzle 100a surrounding the fuel nozzle 98 for blowing out primary oxygen.

In the most outer peripheral part on the nozzle face of the burner 74, a plurality of oxygen nozzles 100b are formed at predetermined equal spaces around the circumference for blowing out secondary oxygen, so that the burner 74 is so designed as to blow out the primary and secondary oxygen through the oxygen nozzles 100a and 100b, respectively.

Furthermore, a plurality of arcuate-oval shaped powder nozzles 102 are formed so as to surround the fuel nozzle 98 between the oxygen nozzles 100a and 100b.

The burner 74 is structured so as to be supplied with the dust 40 and the powdered reducing slag 42 having chemical compositions exemplified in Table 1 and contained in the dust hopper 36 and the slag hopper 38 as shown in FIG. 4, the dust 40 and the slag 42 are blown into a flame of the burner 74 through the powder nozzles 102.

The dust 40 and slag 42 are carried by carrier gas (air) and the dust supply and the slag supply are controlled by valves or feeders 44 and 46 disposed to the supply ports of the hoppers 36 and 38.

Next, an explanation will be given about the operation method for disposing the slag in the powdered or molten state together with the dust by using the above-mentioned furnace 60 on basis of FIG. 7A to FIG. 7D.

FIG. 7A shows an operating state of the furnace 60 in a case of managing the slag in the powdered state.

Namely, in this case, the furnace body 62 is held in a horizontal or near horizontal position (first inclined position) where the outlet port 70 is located in a relatively lower position as shown in FIG. 7A. Subsequently, the fuel is blown out together with oxygen from the fuel oxygen burner 74 and bursts into flame by ignition in this state.

Simultaneously, the dust 40 and the powdered slag 42 are blown into the flame through the powder nozzles 102 of the burner 74, thereby melting successively the dust 40 and the slag 42 in the flame. The molten dust and the molten slag are stored in the storage portion 66 at the bottom section of the furnace body 62, and react sufficiently with each other by being mixed in the storage portion 66.

From the burner 74, the dust 40 and the powdered slag 42 are fed successively into the flame in the furnace body 62 and melted, whereby the molten mixture of dust and slag stored in the storage portion 66 continuously increases in the quantity. Therefore, the molten mixture is discharged successively according to the increase of the molten mixture by overflowing through the outlet port 70 which is situated at the lower position by setting the furnace body 62 at the first inclined position.

Namely, in this case, the outlet port 70 is lowered by holding the furnace body 62 at the first inclined position as shown in FIG. 7A, and the capacity of the storage portion 66 becomes smaller and the molten mixture stored in the storage portion 66 decreases in the quantity. Consequently, thermal radiation from the molten mixture and thermal energy loss are controlled to minimum also in this embodiment.

Furthermore, in the operation state of the furnace 60 shown in FIG. 7A, since the molten dust and the molten slag are mixed and react with each other speedily and sufficiently, it is possible to operate the furnace 60 without hindrance even when the capacity of the storage portion 66 is not so large, and the molten mixture of which chemical compositions are sufficiently uniformized is discharged through the outlet port 70.

FIGS. 7B to 7D show operating procedure of the furnace 60 successively in a case of managing the slag in the molten state through batch wise processing.

In the case of managing the slag in the molten state just after being exhausted from the steel-making furnace, the furnace body 62 is tilted in the clockwise direction by the predetermined angle ($\gamma$=20 deg., for example) as shown in FIG. 7B and situated at the second inclined position where the outlet port 70 becomes higher as compared with the case in which the furnace body 62 has been in the first inclined position.

As it is clear by comparing FIG. 7B with FIG. 7A, the outlet port 70, which was located at the level nearly equal to the surface of the molten mixture when the furnace body 62 was in the first inclined position, is located at a position higher than the surface of the molten mixture by tilting the furnace body 62 in the second inclined position as shown in FIG. 7B. Consequently, the capacity of the storage portion 66 at the bottom section of the furnace body 62 becomes larger as compared with the capacity shown in FIG. 7A.

In this state, the hot slag is charged into the inner part of the furnace body 62 through the slag charging port 82, which has been just exhausted from the steel-making furnace in a large quantity at one time in the molten state.

FIG. 7B shows circumstances in the furnace body 62 in this time. As shown in FIG. 7B, the molten slag is not still mixed sufficiently with the molten mixture stored in the storage portion 66 at the time of being just charged into the furnace body 62. Therefore, the dust 40 is blown successively into the furnace body 62 through the powder nozzles 102 of the fuel oxygen burner 74 and molten in the flame of the burner 74, thereby mixing the molten dust with the molten slag in the furnace body 62. The furnace body 62 is held in this second inclined position during this process, and the molten dust and the molten slag react with each other by being mixed sufficiently in the storage portion 66 having the increased capacity as shown in FIG. 7C.

When the molten slag is mixed and reacts sufficiently with the molten dust in the predetermined quantity, the molten mixture stored in the storage portion 66 of the furnace body 62 is discharged through the outlet port 70 by tilting the furnace body 62 in the anticlockwise direction at a predetermined angle ($\delta$=10 deg., for example) further from the horizon as shown in FIG. 7D. In this manner, the mixture of dust and slag having chemical compositions such as shown in Table 2 is obtained.

In the furnace 60 according to the second embodiment of this invention, the dust and the slag are disposed by changing over the operating position of the furnace body 62 between the first inclined position where the outlet port 70 of the furnace body 62 becomes lower and the second inclined position where the outlet port 70 becomes higher according to the form of the slag, and it is possible to vary the capacity of the storage portion 66 of the same furnace body 62 and to maintain the capacity always in proper, therefore it is possible to manage the slag whether in the powdered state or in the molten state, similarly to the furnace 10 according to the first embodiment.

Furthermore, the furnace body 62 can be constructed in compact, accordingly it is possible to reduce expenses for refractory materials and maintenance, and possible to decrease the thermal radiation from the furnace body 62 and to apply heat of the flame of the fuel oxygen burner 74 on the dust and the slag efficiently.

In addition to above, the furnace 60 having the furnace body 62 of the horizontal type has some advantages as compared with the furnace 10 having the vertical furnace body 12, which has been shown in the first embodiment. The advantages will be described on basis of FIGS. 8A and 8B.

Figure 8A:
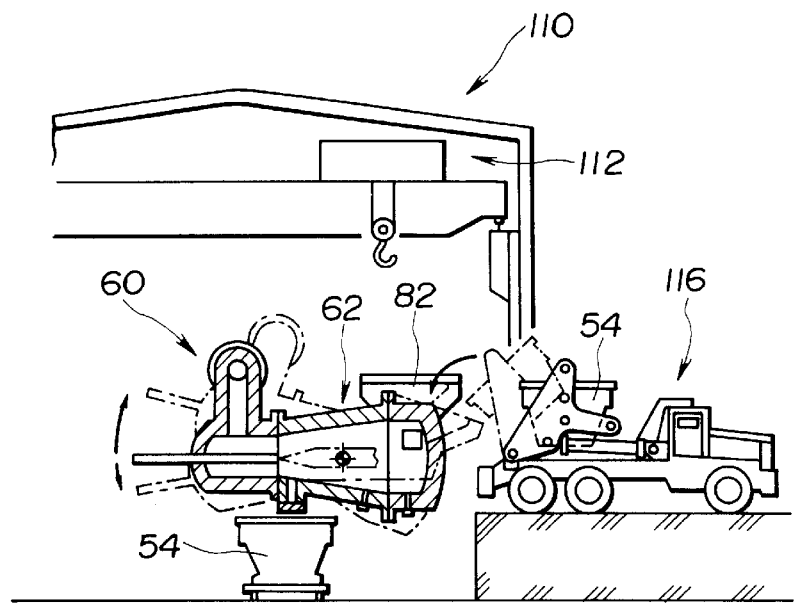
FIGS. 8A and 8B are a vertical sectional views illustrating an advantage in the furnace shown in FIGS. 4 and 5.
Figure 8B:
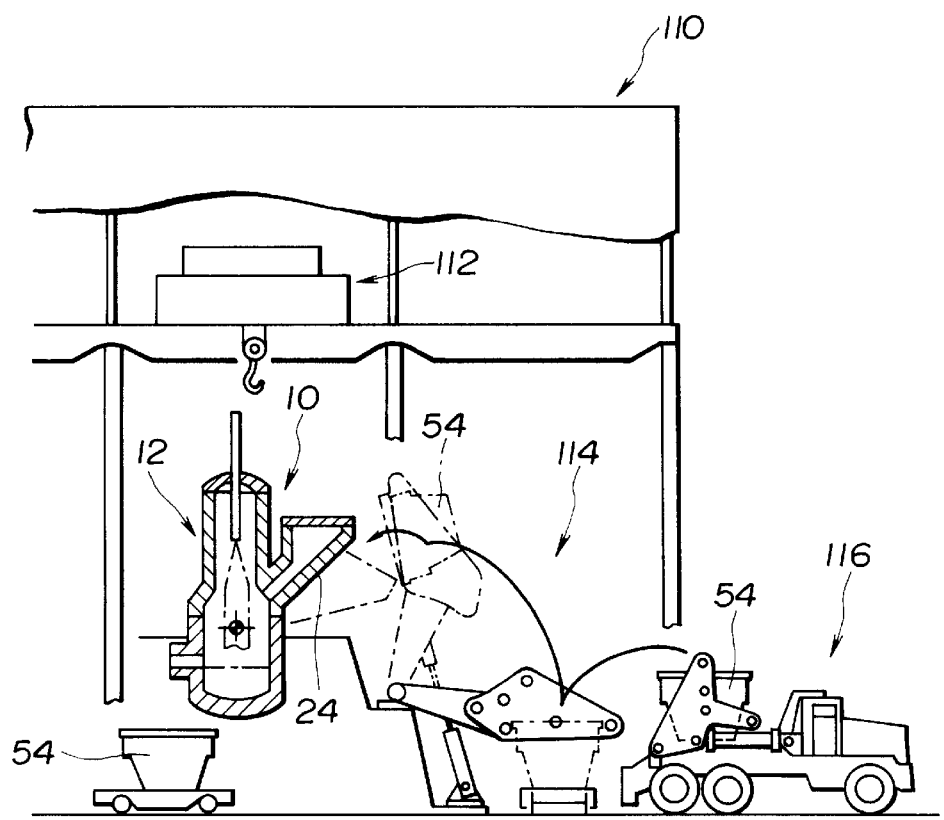

Namely, when the furnace body 12 of the vertical type is used in the furnace 10, it is necessary to construct a tall work building 110 in order to house the tall furnace body 12, and becomes necessary to provide arrangements such as a crane 112 at a higher position as shown in FIG. 8B.

Furthermore, when the molten slag transported from the steel-making furnace by a truck 116 is charged into the furnace body 12, it is necessary to unload the molten slag from the truck 116 together with a container (slag pan) 54, lift up the slag pan 54 by a lifter 114 installed in the vicinity of the furnace body 12, and charge the molten slag into the furnace body 12 through the slag charging port 24, since it is not possible to inject the slag into the slag charging port 24 of the furnace body 12 directly from the truck 116.

As compared above, when the furnace body 62 of the horizontal type is used as shown in FIG. 8A, it is not necessary to construct the work building 110 so high since the furnace body 62 is not so tall, and the arrangements such as the crane 112 may be provided at a lower position.

Additionally, the height of the slag charging port 82 of the furnace body 62 becomes lower, therefore it is possible to charge the molten slag into the furnace body 62 directly from the truck 116 through the slag charging port 82, and the lifter 114 becomes useless.

Furthermore, the furnace body 62 of the horizontal type also has the advantage in being more excellent in the heat efficiency because the flame is blown out in the horizontal direction from the fuel oxygen burner 74 in the furnace body 62 and heat of the flame affects on the molten mixture over the wider range on the surface of the molten mixture stored in the storage portion 66 of the furnace body 62.

The storage portion 66 can be formed in the wide and shallow shape by adopting the furnace body 62 of the horizontal type, and it is possible to vary the capacity of the storage portion 66 in the wide range only by slightly tilting the furnace body 62. Therefore, it is possible to change over the operating position of the furnace body 62 without moving the furnace body 62 so much in the case of setting the furnace body 62 in the second inclined position from the first inclined position and the case of discharging the molten mixture by tilting the furnace body 62 on the side of the first inclined position from the second inclined position.

Although the present invention is described in detail according to the embodiments, this invention is not limited to the aforementioned embodiments, and may be embodied in several forms without departing from the spirit thereof.

For example, in the case of supplying the slag into the furnace body in the powdered state, though the slag is blown into the flame together with the dust from the fuel oxygen burner in the aforementioned embodiments, it is possible to provide a lance nozzle for blowing out the powdered slag and/or the dust separately from the burner so as to supply the slag and/or the dust into the furnace body though the lance nozzle. Furthermore, it is also possible to modify the outlet port, the slag charging port and so on in the form or the position according to circumstances.

What is claimed is:

1. A method for disposal of steel-making waste comprising the steps of:

providing a powdered steel-making slag containing an amount of CaO;

providing dust from dust collecting equipment;

forming a high-temperature flame by burning fuel with oxygen;

supplying the steel-making slag and dust into said high-temperature flame; and melting and mixing said steel-making slag and dust to produce a molten mixture having a decreased CaO content.

2. A method for disposal of steel-making waste comprising the steps of:

providing a molten steel-making slag containing an amount of CaO;

providing dust from dust collecting equipment;

forming a high-temperature flame by burning fuel with oxygen;

melting the dust by supplying said dust into said high-temperature flame; and intimately mixing the molten dust into said molten steel-making slag to produce a molten mixture having a decreased CaO content.

3. A method for disposal of steel-making waste as set forth in claim 1, wherein said CaO is free CaO.

4. A method for disposal of steel-making waste as set forth in claim 1, wherein said steel-making slag is reducing slag produced in a reducing period of steel-making process.

5. A method for disposal of steel-making waste as set forth in claim 1, wherein said dust is steel-making dust.

6. A method for disposal of steel-making waste as set forth in claim 1, wherein said dust is waste incineration dust.

7. A method for disposal of steel-making waste as set forth in claim 1, wherein said dust is steel-making dust and waste incineration dust.

8. A method for disposal of steel-making waste as set forth in claim 2, wherein said CaO is free CaO.

9. A method for disposal of steel-making waste as set forth in claim 2, wherein said steel-making slag is reducing slag produced in a reducing period of steel-making process.

10. A method for disposal of steel-making waste as set forth in claim 2, wherein said dust is steel-making dust.

11. A method for disposal of steel-making waste as set forth in claim 1, wherein said dust is waste incineration dust.

12. A method for disposal of steel-making waste as set forth in claim 1, wherein said dust is steel-making dust and waste incineration dust.

* * * * *